United States Patent

Nyhof et al.

[11] Patent Number: 5,818,650
[45] Date of Patent: Oct. 6, 1998

[54] VIBRATION STABILIZED REARVIEW MIRROR FOR VEHICLES

[75] Inventors: Eldon J. Nyhof, Zeeland; Desmond J. O'Farrell, Holland, both of Mich.

[73] Assignee: Donnelly Corporation, Holland, Mich.

[21] Appl. No.: 687,720

[22] Filed: Jul. 26, 1996

[51] Int. Cl.⁶ ............... G02B 7/182; A47G 1/24; F16M 13/00
[52] U.S. Cl. .......... 359/876; 359/872; 248/479; 248/636
[58] Field of Search ...................... 359/872, 876; 248/478, 477, 483, 488, 479, 636

[56] References Cited

U.S. PATENT DOCUMENTS

| | | | |
|---|---|---|---|
| 4,171,873 | 10/1979 | Repay et al. | 359/874 |
| 4,277,140 | 7/1981 | Manzoni | 248/478 |
| 4,705,368 | 11/1987 | Manzoni | 359/876 |

FOREIGN PATENT DOCUMENTS

| | | |
|---|---|---|
| 0016683A1 | 10/1980 | European Pat. Off. . |
| 0099216A2 | 1/1984 | European Pat. Off. . |
| 3104905 | 8/1982 | Germany ............... 359/872 |
| 1452593 | 10/1976 | United Kingdom . |

*Primary Examiner*—Paul M. Dzerzynski
*Assistant Examiner*—Mark A. Robinson
*Attorney, Agent, or Firm*—Van Dyke, Gardner, Linn & Burkhart, LLP

[57] ABSTRACT

A vibration-stabilized rearview mirror assembly for vehicles includes a reflective mirror element pivotally mounted in a mirror housing with at least one vibration stabilizer slidably mounted on and biased outwardly beyond the perimeter edge of the mirror element to engage the inside of the housing and to dampen and reduce vibration of the mirror element. Preferably, two stabilizers are slidably mounted parallel to the mirror element at spaced locations and are engaged by a single spring which equalizes the spring force on both stabilizers. Stop surfaces limit extension of the stabilizers.

30 Claims, 4 Drawing Sheets

VIBRATION STABILIZED REARVIEW MIRROR FOR VEHICLES

FIELD OF THE INVENTION

This invention relates to rearview mirrors for vehicles and, more particularly, to a vehicular rearview mirror assembly, and especially an exterior rearview mirror assembly, including vibration dampeners/stabilizers which reduce the vibration of an adjustable mirror element within its housing caused by road shocks, vehicle operation and/or air turbulence.

BACKGROUND OF THE INVENTION

Rearview mirror assemblies used in motor vehicles, and especially exterior rearview mirror assemblies secured to the sides of a vehicle, typically include manual or electrical adjustment mechanisms allowing movement of the reflective mirror element to various positions suitable for viewing traffic and other conditions to the side and rear of the vehicle. As a consequence of such adjustable mounting, various sources of vibration affect the visibility of images reflected by the mirror element causing both annoyance and a safety hazard. Vibration results from road surface discontinuities over which the vehicle is driven, such as textured surfaces, bumps, potholes, uneven seams and/or rumble strips, as well as from various vehicle components including the engine, gear box, drive shaft and the like. In addition, vibration also results from air turbulence created by the air flow over the exterior mirror assembly in the vehicle slip stream, or from off axis wind striking the reflective mirror element.

Until recently, the problem of vibration in exterior rearview mirror assemblies has not received significant attention, particularly in North America. However, as vehicle specifications have evolved, vehicle suspensions have become stiffer and minimum driving speeds have moved upwardly resulting in greater vibration affecting the rearview mirror as well as increased driver awareness of vibration affecting his or her vision.

Many solutions to exterior mirror assembly vibration have been proposed. These include the use of significantly stiffer polymer resins to support the glass and/or actuator assemblies in such mirrors. In addition, radially mounted, antivibration members on the rear surface of the reflective element subassembly for engagement with the surrounding mirror have also been used. To date, such anti-vibration members have constituted one or more spring-loaded, contact members which are usually mounted on the axis of rotation of the reflective element or radially around its center of rotation. In one structure currently in use, a contact member is pivotally mounted to the edge of a mirror support behind the reflective mirror element and urged outwardly by a coil spring into engagement with a curved surface on the inside of the mirror housing. The curved contact surface follows a radius of the center of rotation of the mirror element.

In other currently known structures, outwardly extending, metallic spring members are positioned adjacent the edge of the rear surface of the mirror element on a support member and are sufficiently resilient to be urged outwardly into contact with the inside surface of the mirror housing. Again, the inside surface of the housing in such structures is formed along a radius of the center of rotation of the mirror element such that the distance between the contact member and the engaged surface remains constant during all pivotal movement of the mirror element.

In each of the currently known rearview mirrors incorporating anti-vibration structures, the individual contact points must have an essentially spherical mating surface to ensure constant force and continuous engagement with the mirror housing. However, this significantly limits the designs available for such mirror assemblies. For example, the mirror housing must be formed in a specific spherical shape or include an internal component, such as a bracket, which includes a spherical surface, for contact with the contact members. Further, each contact member must be formed from a spring material, or requires its own independent spring to insure substantially uniform loading. As such, the radially positioned surface requirement limits design freedom and increases component costs for the mirror housing and/or bracket. In addition, multiple components are required and the complexity of the assemblies is increased due to such requirements. Further, the cost and expense for manufacturing such assemblies is significantly increased because of increased tooling complexity.

The present invention provides a lower cost, simplified vibration stabilized rearview mirror assembly for vehicles, and especially exterior mirrors which overcomes the above problems while providing greater design flexibility, requiring fewer components, and being less costly and complex to manufacture.

SUMMARY OF THE INVENTION

Accordingly, the present invention provides a vibration stabilized rearview mirror assembly for vehicles, and especially exterior rearview mirror assemblies, in which one or more vibration dampeners or stabilizers are mounted on the pivotally adjustable reflective mirror subassembly such that they are slidably extended and retracted by a spring member but without requiring the provision of a surface on the surrounding mirror housing which is at a fixed radial distance from the center of the rotation of the mirror element. Hence, rearview mirror housings of various designs which need not always include a spherical interior surface may be used, thereby providing greater design flexibility, lower costs and improved visibility in the mirror.

In one form, the invention is a vibration stabilized rearview mirror assembly for vehicles including a mirror housing having an inside surface defining an interior space, a reflective mirror element having a perimeter edge and adjustably mounted for pivotal movement within the housing interior space and, a vibration stabilizer mounted for sliding movement on the mirror element, extending beyond the perimeter edge of the mirror element and engaging a first portion of the inside surface of the housing. A spring engages and biases the stabilizer outwardly of the mirror element perimeter edge such that the stabilizer continuously engages the inside housing surface to reduce vibration of the mirror element. The stabilizer is extended by and retracts against the spring to adjust for varying distances between the perimeter edge of the mirror element and the inside housing surface when the position of the mirror element within the housing is adjusted.

In preferred aspects of the invention, the mirror assembly also includes a second vibration stabilizer mounted for sliding movement on the mirror element and also extending beyond the perimeter edge thereof at a position spaced from the first stabilizer. The second stabilizer engages a second portion of the inside housing surface while the spring simultaneously engages both the first and second stabilizers and simultaneously biases both the stabilizers into engagement with their respective inside housing surface portions. Thus, the need for separate springs for each stabilizer is eliminated.

In other aspects, each stabilizer is preferably supported by a slide mount for sliding movement in a predetermined direction and generally parallel to the rear surface of the mirror element. Preferably, the stabilizers extend at right angles to one another, such as across the top or bottom edge of the mirror element and across one of the end edges.

In addition, the stabilizers may be mounted on a support member or holder for the reflective mirror element and may be mounted either on the rear surface of the support member or the front surface intermediate the reflective mirror element and the support member. In either case, the stabilizers preferably include a shoulder which engages a stop surface which limits extension of the stabilizer such that each stabilizer constantly engages the spring and remains under load. Use of the single spring member provides generally equivalent loading of the stabilizers but without the need to match and support multiple spring members in the assembly. Preferably, an elongated spring extends around a spring support and has a pair of outwardly extending ends of generally equivalent length, one of the spring ends engaging the first stabilizer and the other of the spring ends engaging the second stabilizer. If desired, a second pair of stabilizers could also be included for additional vibration reduction. Such stabilizers would preferably extend beyond the perimeter edge of the mirror element at positions opposed to the positions of the first set of stabilizers.

As will be understood from the various embodiments of the invention, the present vibration stabilized rearview mirror assembly for vehicles provides greater flexibility in design of the mirror housing since spherical surfaces which are positioned at a constant radial distance from the center of rotation of the mirror element in the housing are no longer required in order to provide proper vibration dampening or stabilization. The slidable mounting of the vibration stabilizers in the present invention enables varying distances between the edge of the adjustable mirror element and the inside mirror housing surface to be easily accommodated while contact is maintained. In addition, the complexity of the present invention is reduced as compared to prior known vibration stabilized rearview mirror assemblies which require separate springs for each contact member or require formation of the contact members from spring material. Rather, in the present invention, a single spring preferably operates a pair of vibration stabilizers while maintaining substantially equivalent loading on each regardless of the distance between the edge of the pivotal mirror element and the inside housing surface. As a consequence, mirror housings may be designed with a wider range of configurations while costs are reduced due to more simplified construction.

These and other objects, advantages, purposes and features of the invention will become more apparent from a study of the following description taken in conjunction with the drawings.

DESCRIPTION OF THE PREFERRED EMBODIMENTS

Figure 1:
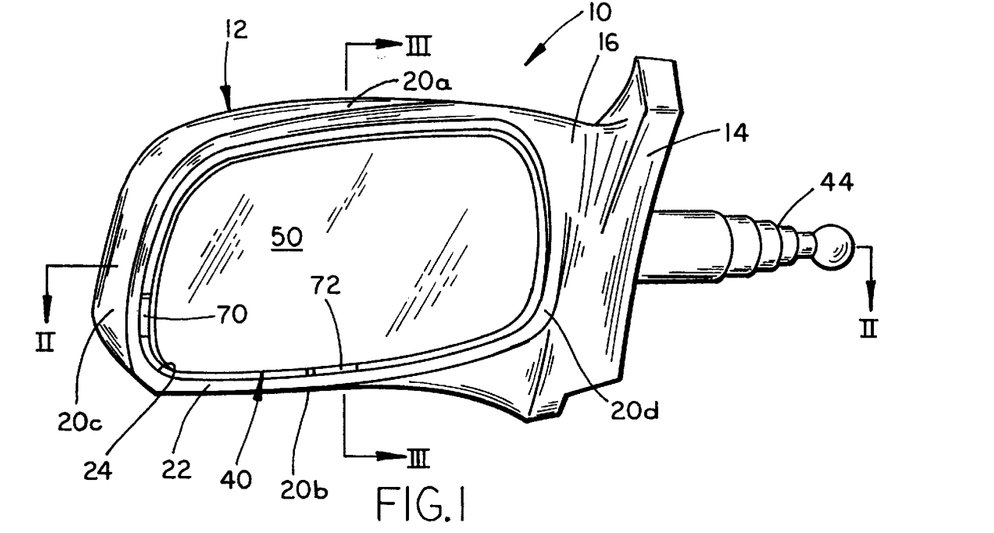
FIG. 1 is a perspective view of a first embodiment of the vibration stabilized rearview mirror assembly for vehicles of the present invention.
Figure 2:
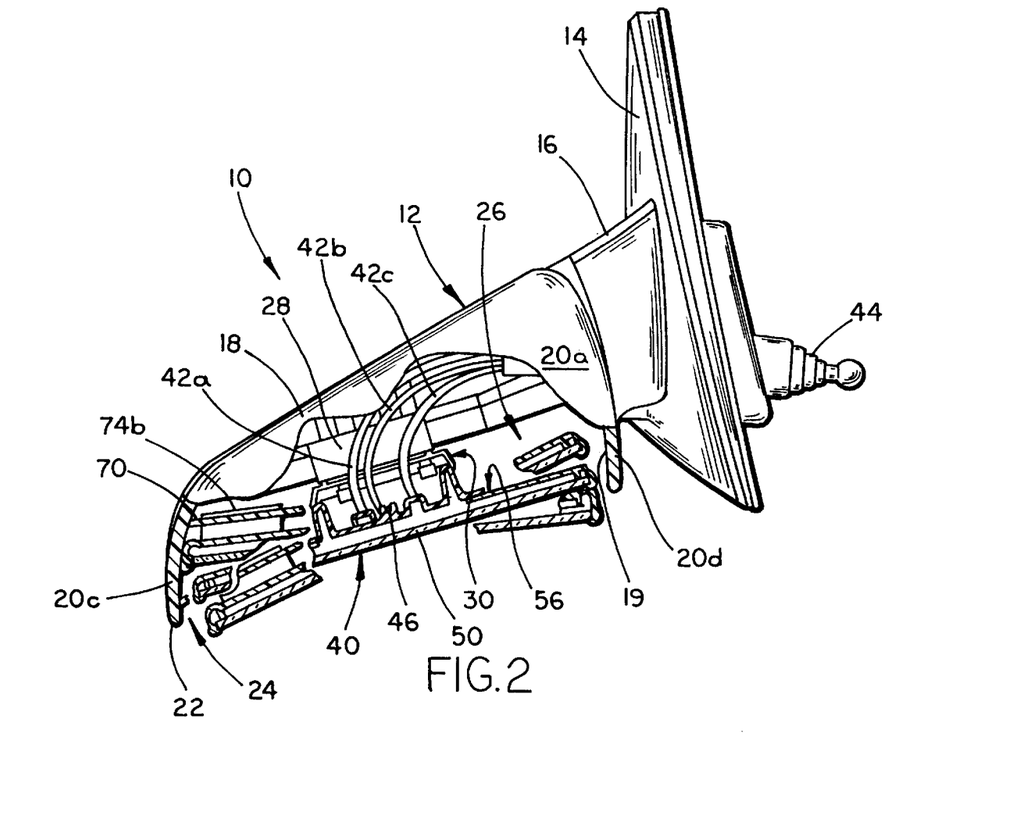
FIG. 2 is a top plan view of the mirror assembly of FIG. 1 with portions broken away and the reflective mirror unit subassembly shown in cross section and in its various adjusted positions and taken along plane II—II of FIG. 1.
Figures 3, 5:
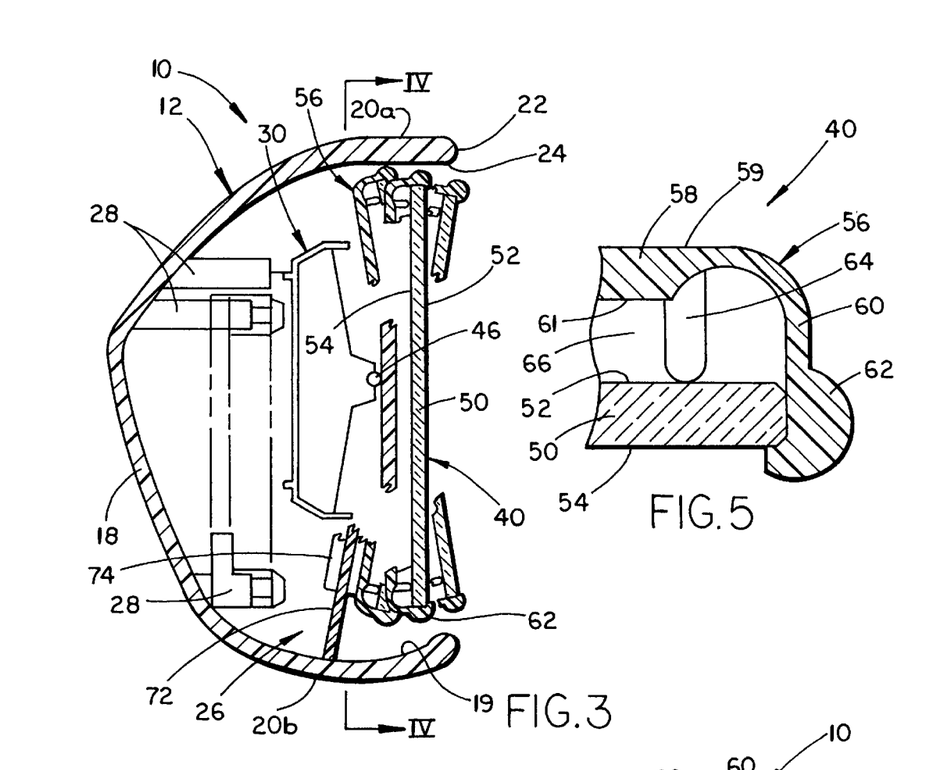
FIG. 3 is a sectional end elevation of the mirror assembly of FIGS. 1 and 2 taken along plane III—III of FIG. 1, again illustrating the various positions of the mirror unit subassembly when adjusted.
FIG. 5 is an enlarged, fragmentary, sectional elevation of the mirror unit subassembly including a reflective mirror element and a molded resinous plastic mirror holder or support member.

Referring now to the drawings in greater detail, FIG. 1 illustrates a first embodiment 10 of a vibration stabilized exterior rearview mirror assembly for motor vehicles incorporating the present invention. Assembly 10 includes an aerodynamically shaped mirror housing 12 connected to a support structure conventionally known as a "sail" 14 by a hollow, connecting neck 16. Mirror housing 12, along with support 14 and connector 16, are preferably integrally molded as a unit from a resinous plastic material, such as CAPRON™ nylon, available from Allied-Signal Engineered Plastics of Morristown, N.J. or VYDINE™ nylon from Monsanto Plastics of St. Louis, Mo. As shown in FIGS. 1–3, mirror housing 12 preferably includes a solid or imperforate aerodynamically shaped rear wall 18 and a continuous peripheral wall 20 including top 20a, bottom 20b, and left and right end walls 20c, 20d, respectively. Wall 20 terminates in a peripheral edge 22 which defines a rearwardly facing opening 24 to the interior space 26 within housing 12 in which a pivotally adjustable reflective mirror unit is mounted.

As is best seen in FIGS. 2 and 3, the interior of housing 12 includes a series of upstanding supports or posts 28 on which is mounted an actuator unit 30 on the inside surface of rear wall 18. Actuator 30 provides a pivot support for pivotal adjustment of a mirror element subassembly or unit 40 which is adapted for either manual or electrical actuation from a remote location. As shown in FIGS. 2 and 3, mirror assembly 10 includes a manually adjustable actuator including a three cable, Bowden-wire unit 42 including cables 42a, 42b and 42c leading to a joy stick controller 44 which extends through connecter 16 and support 14 into the interior of the vehicle adjacent the driver's position for actuation by a driver of the vehicle. Actuator 30 includes a pivot 46 (FIG. 3) providing a center of rotation for mirror unit 40 with respect to the actuator regardless of whether the actuator is manually or electrically operable. As will be understood, various types of electrical actuators may be used in mirror assembly 10 as substitutes for the manual actuator unit 30. Generally, such electrical actuators include one or a pair of electrical motors which operate extendible/retractable drive posts engaging the rear of the mirror unit at a pair of spaced locations to provide universal pivotal adjustment of the mirror unit about pivot center 46. Such actuators are connected electrically by wiring extending through hollow connector 16 and support 14 to the vehicle electrical system and an appropriate switch or electrical controller mounted on the instrument panel or door of the vehicle.

As is best seen in FIGS. 2, 3, 5 and 6, mirror unit 40 preferably includes a planar or curved reflective mirror element formed from an optically clear, planar or bent glass or plastic sheet having either a first or second surface reflective layer thereon. In the preferred embodiment, a metallic reflective layer containing chrome and other metals as is conventionally known is provided on the second or rear surface 52 of the mirror element 50 while the first surface 54 of the mirror element is uncoated.

Alternately, variable reflectance, electro-optic mirror elements could be used as mirror element 50, such as an electrochromic cell of either the solid-state type or electrochemichromic type. Such an element is an electrochromic mirror cell which includes a transparent, front glass sheet and a transparent, rear glass sheet having a reflective coating applied to its rear surface. The front glass and reflective rear glass are slightly offset relative to one another such that the upper and lower edges project for connection to appropriate metal connection strips. A variable light transmittance, electrochromic layer is sandwiched in the space between the front glass and rear glass. The front surface of the rear glass and rear surface of the front glass each have a transparent electroconductive coating, such as indium tin oxide or doped tin oxide or the like, to conduct electricity across the full contact extent of the electrochromic layer from the connection strips secured at the offset top and bottom of the front and rear glass sheets. When controlled by a suitable electrical circuit, electrical voltage is applied across electro-optic cell between the front glass and the rear glass causing a variation in the transmittance of the electrochromic layer such as darkening or opacity to reduce the light reflected by the reflective rear glass. The electrochromic layer may, for example, be an electrochromic layer such as is described in commonly-assigned U.S. Pat. Nos. 5,140,455 and 5,151,816 or in the following publications: N. R. Lynam, "Electrochromic Automotive Day/Night Mirrors", *SAE Technical Paper Series,* 870636 (1987); N. R. Lynam, "Smart Windows for Automobiles", *SAE Technical Paper Series,* 900419 (1990); N. R. Lynam and A. Agrawal, "Automotive Applications of Chromogenic Materials", *Large Area Chromogenics: Materials and Devices for Transmittance Control,* C. M. Lampert and C. G. Granquist, EDS., Optical Engineering Press, Washington (1990), the disclosures of which are each hereby incorporated by reference herein.

Mirror element 50 is preferably retained and held in a mirror support or backing plate 56 including a solid or imperforate rear wall 58 and a peripheral, upstanding side wall or rim 58 which extends generally perpendicularly outwardly from rear wall 58. Peripheral side wall or rim 60 terminates in a generally bulbous or rounded peripheral edge 62 which is formed over and extends inwardly along the front surface 54 of mirror element 50 a predetermined distance to hold mirror element 50 against a series of upstanding supports or posts 64 extending toward the mirror glass from the inside surface of rear wall 58. Thus, mirror support 56, which is preferably molded from ABS resinous plastic, provides a hollow interior space 66 between the inside surface of rear wall 58 and the rear surface 52 of reflective mirror element 50. As shown in FIGS. 2 and 3, when pivotally mounted on pivot 46 in actuator unit 30, mirror unit 40 may be pivotally adjusted via the adjustment cables 42 and controller 44 to the left or right and upwardly or downwardly, the extremes of such pivotal movement being shown in broken lines in those drawings figures. As shown therein, during such pivotal movement, the outside surface of peripheral side wall 60 and perimeter 62 define a variable distance with the inside surface 19 of mirror housing 12 depending on the position of the mirror unit. For example, as shown in FIG. 2, the left end of mirror unit 40 is closer to the inside surface 19 of mirror housing 12 when pivoted toward the left than when it is pivoted fully to the right when the left end extends slightly outwardly of the housing. Similarly, the upper and lower edges of the mirror unit 40 are at varying distances with respect to the inside surface 19 of housing 12 depending on the specific pivotal position.

Figure 4:
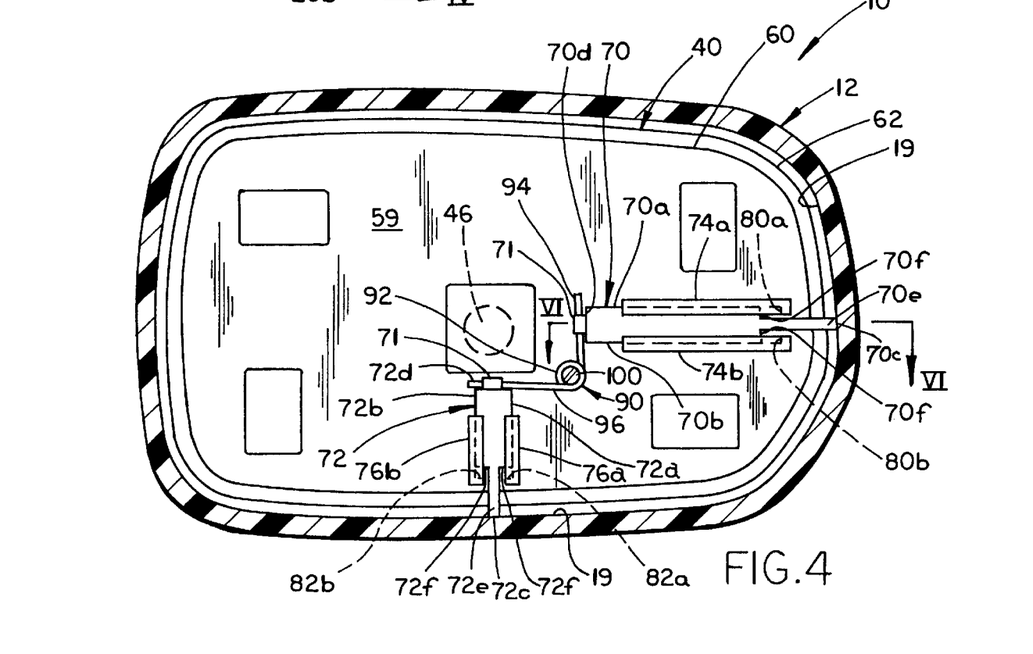
FIG. 4 is a rear sectional elevation of the pivotal mirror unit subassembly within the mirror housing taken along plane IV—IV of FIG. 3 and illustrating a pair of vibration stabilizers thereon.
Figure 6:
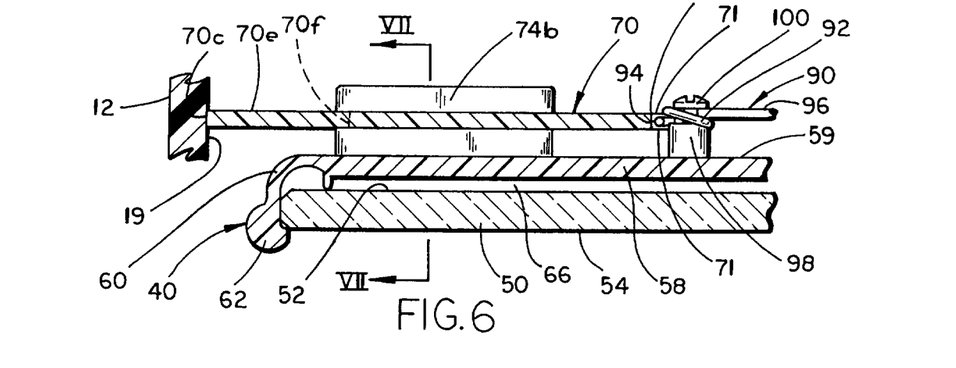
FIG. 6 is a sectional, side elevation of one of the vibration stabilizers slidably mounted on the rear surface of the mirror support member taken along plane VI—VI of FIG. 4.

As shown in FIGS. 1, 2, 4 and 6, mirror assembly 10 preferably includes a pair of vibration dampeners or stabilizers 70, 72 which are each mounted for sliding movement with respect to rear surface 59 of rear wall 58 of mirror support 56 and extend outwardly preferably along the axes of rotation of pivot center 46. As is best seen in FIGS. 4 and 6, each vibration dampener or stabilizer 70, 72, which may have differing overall lengths as shown in FIG. 4, is preferably formed from a relatively thin sheet of low friction coefficient resinous plastic such as MAGNUM™ ABS plastic available from Dow Chemical Company of Midland, Michigan, and includes opposed, generally parallel side edges 70a, 70b and 72a, 72b, a front mirror housing engaging edge 70c, 72c and a rear spring engaging edge 70d, 72d. Preferably, stabilizers 70, 72 comprise elongated resinous plastic fingers having a reduced width front portion 70e, 72e terminating in housing engaging edge 70c, 72c. The reduced width portions 70e, 72e define shoulders 70f, 72f on either side, which shoulders extend outwardly to the generally parallel side edges to provide stop engaging surfaces to limit extension of the stabilizer fingers beyond the peripheral side edge of the mirror support 56 as explained more fully below.

Figures 7, 9:
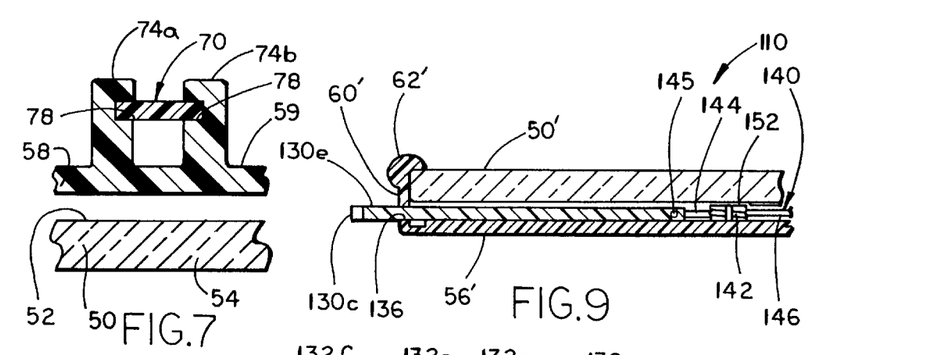
FIG. 7 is a sectional end elevation of the vibration stabilizer taken along plane VII—VII of FIG. 6.
FIG. 9 is a fragmentary, sectional side elevation of one of the vibration stabilizers of the mirror unit shown in FIG. 7 taken along plane IX—IX of FIG. 8.

As shown in FIGS. 4–7, each stabilizer finger 70, 72 is preferably mounted to extend in a different direction at a different location on the rear surface 59 of mirror support 56 such that it is slidably mounted generally parallel to the rear surface 59 but extends beyond the peripheral edge 60, 62 for engagement with the inside surface of the mirror housing. The stabilizer fingers are respectively, slidably mounted in slide mounts 74, 76, each slide mount including a pair of spaced slide flanges 74a, 74b and 76a, 76b. Each slide mount includes a pair of rectilinear grooves 78, one on the inside surface of each slide flange 74a, 74b, 76a, 76b, as shown in FIG. 7. The side edges of the stabilizer fingers 70, 72 are fitted within grooves 78 for sliding movement generally parallel to rear surface 59. In addition, each slide flange includes an inwardly extending stop or limit surface 80a, 80b, 82a, 82b, as shown in FIG. 4. Stop surfaces 80, 82 engage shoulders 70f, 72f to limit the sliding extension of stabilizer fingers 70, 72 and to maintain contact with the biasing spring as explained more fully below. When housing engaging edges 70c, 72c are engaged with inside housing surface 19, shoulders 70f, 72f are spaced from stop surfaces 80, 82 to provide space for additional extension of fingers 70, 72 in the event the gap between the edge 60, 62 and housing surface 19 increases as the mirror unit 40 is pivoted.

As is best seen in FIGS. 4 and 6, stabilizing fingers 70, 72 are biased outwardly in slide mounts 74, 76 by means of a single hairpin-type spring 90 preferably formed from spring steel. Spring 90 simultaneously engages the rear edges 70d, 72d of each stabilizing finger to provide substantially equal force and loading, urging the fingers 70, 72 outwardly. Hairpin-type spring 90 includes a central circular section 92 from which a pair of elongated spring ends extend outwardly at generally at an angle of about 90° to one another when not under load. Spring ends 94, 96, which have generally the same length, are adapted to engage the rear edges of stabilizing fingers 70d, 72d and push or bias the spring fingers slidably outwardly until housing engaging edges 70c, 72c engage spaced portions of the inside surface 19 of the housing 12. One or more types of mounting structures for supporting spring 90 may be used. Preferably, as shown in FIGS. 4 and 6, a cylindrical mounting post or spring support 98 is molded to extend outwardly from the rear surface 59 of mirror support 56 and includes a reduced diameter section near its outer end over which the center section 92 of spring 90 is placed and retained by a threaded fastener 100. Preferably, slide mounts 74, 76 and fingers 70, 72 are spaced approximately equidistantly from the center of axis of post 98 and on the axes of rotation of pivot center 46 as shown in FIG. 4. Spring ends 92, 94 may be retained against the rear edge 70d, 72d of stabilizing fingers 70, 72 by means of rearwardly extending, U-clamp flanges 71 which are formed on or attached to rear edges 70d, 72d defining a spring end receiving space therebetween. Alternately, the end or rear edges 70d, 72d of stabilizers 70, 72 may be widened or thickened to provide a secure contact surface for spring ends 92, 94.

As will now be understood from FIGS. 4 and 6, when mirror unit 40 is pivotally mounted within mirror housing 12 on actuator unit 30 on pivot center 46, stabilizer fingers 70, 72 are slidably mounted in slide mounts 74, 76 such that the front, housing surface engaging edges 70c, 72c extend beyond the peripheral side edge of mirror support 56 for engagement with the interior surface 19 of housing 12. Spring 90 is mounted on post 98 via fastener 100 such that spring ends 94, 96 are held by flanges 71 and engage the rear edges 70d, 72d of stabilizer fingers 70, 72 to urge them outwardly. The length of each stabilizer finger 70, 72 is predetermined such that, when mounted in slide mounts 74, 76, the housing engaging edge 70c, 70d will extend a sufficient distance to engage the inner housing surface at all times, regardless of the pivotal position of mirror unit 40 as shown in FIGS. 2 and 3. When the gap between the peripheral edge of mirror unit 40 and the inside surface 19 of housing 12 becomes smaller as the mirror unit is pivoted, the stabilizing fingers 70, 72 slide along the housing surface and are forced inwardly against the biasing force of spring 90, which force is generally equivalent on each of the stabilizing fingers because each engages approximately the same length spring end. Likewise, when the gap increases as the mirror unit is pivoted, spring ends 94, 96 urge fingers 70, 72 outwardly to maintain edges 70c, 70d in contact with inside housing surface 19.

Preferably, spring 90 provides a force within the range of between about 3 and 15 Newtons acting against each of the stabilizing fingers in directions generally parallel to the mirror element and surface 59 via spring ends 94, 96. Prior to mounting of the mirror unit 40 in the mirror housing, however, stabilizing fingers 70, 72 are maintained in engagement with spring ends 94, 96 by shoulders 70f, 72f engaging stops 80, 82 in the slide mounts to prevent the spring from forcing the stabilizing fingers out of slide mounts 74, 76. As will also be apparent, the stabilizing fingers can slide inwardly different distances at the same time against spring ends 94, 96 such that the gap between the top, bottom or end edges of the mirror unit and the inside surface of the mirror housing need not be uniform or equivalent at the positions of the stabilizing fingers. Use of the stabilizing fingers of the present invention provides a reduction in vibration of the mirror element within the housing such that visibility of images in the mirror is substantially improved.

Figure 8:
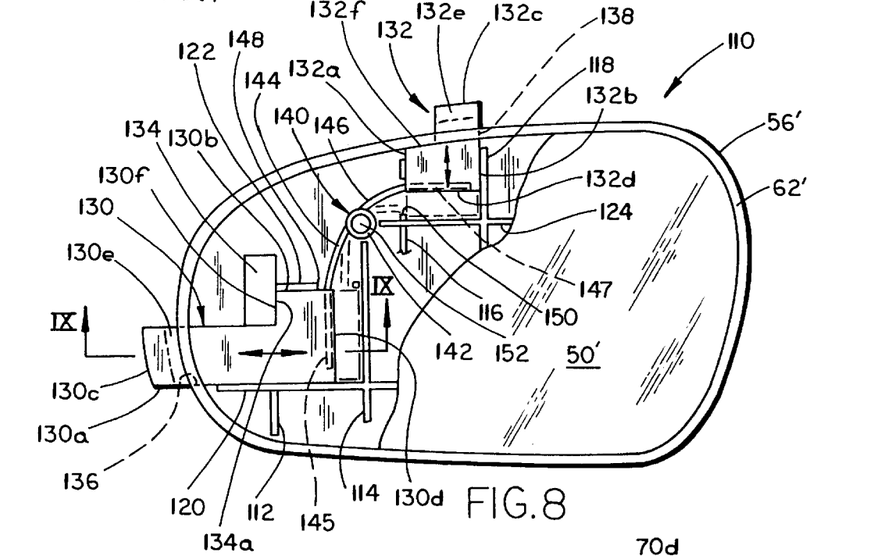
FIG. 8 is a front elevation of another embodiment of the mirror unit subassembly including a second embodiment of the vibration stabilizer of the present invention slidably mounted on the support member intermediate the support member and the reflective mirror element.

With reference to FIGS. 8 and 9, the vibration dampeners or stabilizers may be mounted on the mirror support in space 66 between the reflective mirror element and the inside surface 61 of the mirror support 56. As shown in FIG. 8, mirror unit 110 of the alternative embodiment of the present invention preferably includes a plurality of stiffening ribs 112, 114, 116, 118, 120, 122 and 124 which extend at 90° to one another and also serve as slide mounts or guides for stabilizing fingers 130, 132. Each stabilizing finger 130, 132, like stabilizers 70, 72, is preferably formed from a thin sheet of resinous, polymeric material, such as ABS plastic and includes a pair of generally parallel side edges 130a, 130b, 132a, 132b, a front mirror housing engaging edge 130c, 132c and a rear edge 130d, 132d. Mirror housing engaging edge 130c, 132c is formed on a reduced width section 130e, 132e which define shoulders 130f, 132f extending at 90° to the side edges and are adapted to engage stop or limit surfaces on the mirror support 56'.

Stabilizing fingers 130, 132 are preferably slidably mounted between parallel ribs or slide guides 10, 122 and 116, 118 such that they extend in directions which are perpendicular to one another while extending beyond the peripheral edge of mirror support 56'. Mirror support 56' is also provided with a rectangular projection 134 having a stop surface 134a adapted to engage shoulder 130f to limit the outward extension of the stabilizer finger 130. Reduced width portion 130e of finger 130 projects through an aperture 136 (FIG. 8) in the upstanding side wall or rim 60' of mirror support 56'. Likewise, reduced width portion 132e of finger 132 extends through a similar aperture 138 (FIGS. 8 and 9) in the upstanding side wall 60' of mirror support 56' at a spaced location along the side wall. Shoulder 132f engages the inside surface of the peripheral side wall 60' adjacent aperture 138 to form a stop surface limiting extension of stabilizer finger 132 within guides 116, 118.

As is best seen in FIG. 8, a hairpin-like spring 140 similar to spring 90 engages both stabilizers 130, 132 to urge them outwardly such that edges 130c, 132c engage spaced inside surface portions of the mirror housing for dampening vibration of the mirror unit 110. Spring 140 includes a coil-like circular center section 142 and outwardly extending end portions 144, 146, each of which has approximately the same length and is inserted in a corresponding aperture 145, 147 in stabilizer 130, 132, respectively, for receiving the spring ends. Apertures 145, 147 open through sides 130b, 132a adjacent openings or recesses 148, 150 in ribs 122, 116, respectively, allowing the spring ends 144, 146 to project through the ribs or guides for access and loading of stabilizers 130, 132. Like cylindrical post 98 in embodiment 10, mirror unit 110 includes an upstanding circular projection or spring support 152 about which center section 142 of spring 140 is wrapped for mounting and location intermediate the stabilizers. Although somewhat offset from the axes of rotation of mirror unit 110 when mounted in a mirror housing, stabilizers 130, 132 are preferably spaced approximately equidistantly from the center or axis of spring support 152. Since projection 152 is formed on the inside surface of mirror support 56', and reflective mirror element 50' is secured within the inwardly projecting lip of perimeter rim 62', after mounting of the spring 140 and stabilizers 130, 132, no separate fastener is required to hold the spring in place after mirror element 50' is secured on the mirror support. As in embodiment 10, spring 140 in mirror unit 110 provides generally equivalent loading simultaneously of stabilizers 130, 132 such that each projects beyond the perimeter edge of the mirror unit into engagement with the mirror housing inside surface as limited by shoulders 130ƒ, 132ƒ engaging projection surface 134a and the inside of peripheral rim 60' adjacent aperture 138. As the gap or space between the edge of the mirror unit and the inside housing surface changes during pivotal adjustment of the mirror unit in the housing, the stabilizers 130, 132 independently retract against the force of the spring ends which provide constant force urging them outwardly to maintain the vibration dampening. As in embodiment 10, spring ends 144, 146 of spring 140 are adapted to provide a force generally within the range of the between about 3 and 15 Newtons urging each of the stabilizers outwardly until as limited by the shoulders and stop surfaces.

A third embodiment of the mirror unit subassembly including another form of vibration dampener/stabilizer is shown at 170 in FIGS. 10–14. In this embodiment, modified slide mounts 172, 173 are molded on mirror support 171 from ABS plastic. Each slide mount 172, 173 includes a pair of spaced, slide guides or flanges 174, 176, and 175, 177 each of which is generally L-shaped in cross section and includes a vertical wall 174a, 176a or 175a, 177a and a laterally extending top wall 174b, 176b, or 175b, 177b. Top walls 174b, 176b, and 175a, 177a extend inwardly toward one another to define an interior space 179 in which is fitted a generally rectangular stabilizer 190. An upstanding, triangularly shaped projection 178 extends upwardly within the interior space and includes an inclined surface 180 and a vertical face 182.

Figure 11:
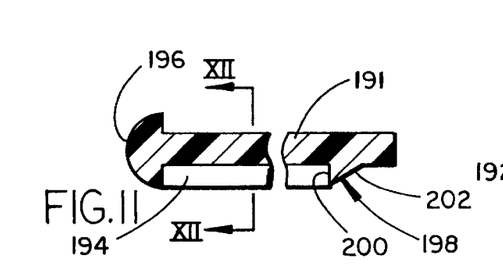
FIG. 11 is a sectional, side elevation of one of the slidable vibration stabilizers taken along plane XI—XI of FIG. 10.
Figure 12:
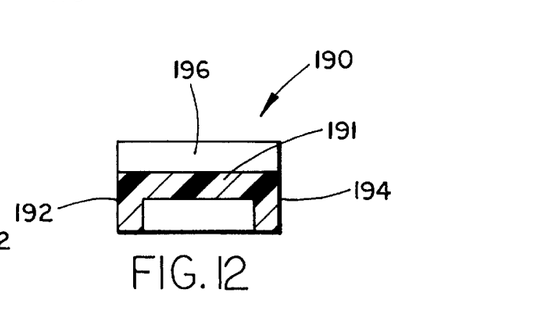
FIG. 12 is a sectional, end elevation of the vibration stabilizer taken along plane XII—XII of FIG. 11.
Figures 13, 14:
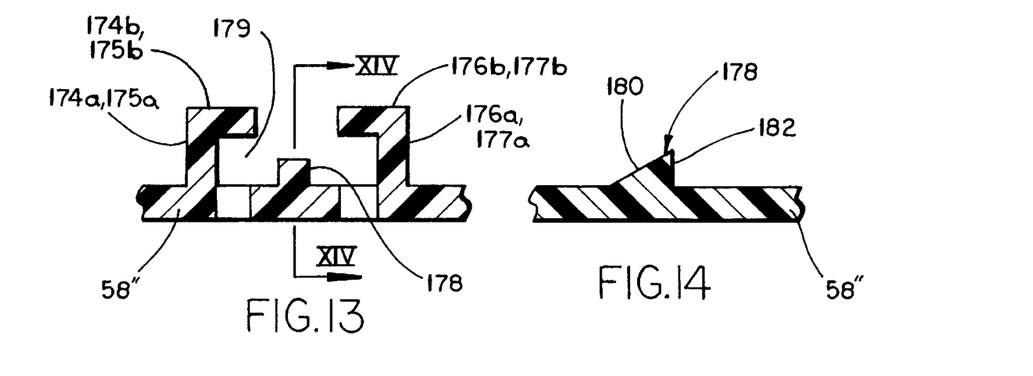
FIG. 13 is a sectional, end elevation of one of the slide mounts for the vibration stabilizers of FIG. 10 taken along plane XIII—XIII of FIG. 10.
FIG. 14 is a sectional, side elevation of a portion of the slide mount taken along plane XIV—XIV of FIG. 13.

As is best seen in FIGS. 11 and 12, stabilizers 190 are each generally rectangular and molded from a resinous plastic material, such as ABS plastic, and have a main body portion 191 with a generally U-shaped, downardly opening, cross section formed by downwardly extending side flanges 192, 194 which extend rearwardly from a forward, bulbous mirror housing engaging surface 196. Body portions 191 may be of different lengths to fit in different length slide mounts 172, 173, but still extend beyond the edge of mirror support 171 while extending inwardly beyond the inner ends of slide flanges 174,176 or 175, 177 to engage spring ends 216, 218 as explained below. Surface 196 extends transversely across the front of the stabilizer body and has a rounded outer surface for sliding engagement with the mirror housing. A triangular projection 198 extends downwardly in the center of the U-shaped opening and has a vertical face 200 and an inclined surface 202. Surface 198 is adapted to engage surface 182 on projection 178 when stabilizer 190 is mounted within guide flanges 174, 176 to limit extension of the housing engaging edge 196 in the same manner as do shoulders 70ƒ, 72ƒ, 130ƒ, and 132ƒ in embodiments 10 and 110. Inclined surfaces 180, 202 are adapted to ride over another in cam-like fashion when stabilizer 190 is slidably inserted in the opening 179 from adjacent the perimeter edge of mirror unit 170 during installation. Once projection 200 is cammed over projection 178, vertical faces 182, 198 engage one another to prevent removal of the stabilizer from the slide mount and limit extension.

Figure 10:
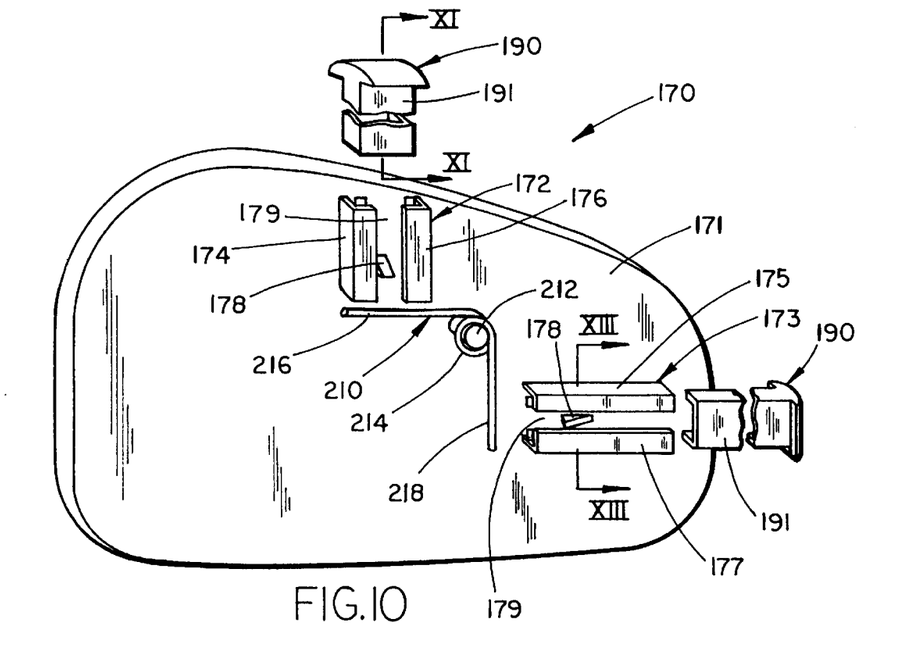
FIG. 10 is a perspective view of the rear surface of a mirror unit subassembly including a third embodiment of the vibration stabilizers of the present invention.

As in embodiments 10, 110, a single hair-pin like spring 210 similar to springs 90, 140 has a coil-like center section 214 mounted about cylindrical projection or spring support 212 with spring ends 216, 218 of generally the same length respectively engaging the rear edges of stabilizers 190 to urge them simultaneously outwardly as limited by surfaces 182, 198. Stabilizers 190 and slide mounts 172, 173 are preferably spaced approximately equidistantly from the axis of spring support 212, preferably on the axes of rotation or pivotal movement of mirror support 171 when mounted in a mirror housing. Otherwise, stabilizers 190 may be substituted for any of the stabilizers or dampeners 70, 72, 130, or 132 in either embodiment 10 or 110.

While several forms of the invention have been shown and described, other forms will now be apparent to those skilled in the art. Therefore, it will be understood that the embodiments of the invention shown in the drawing and described above are merely for illustrative purposes and are not intended to limit the scope of the invention which is defined by the claims which follow.

We claim:

1. A vibration-stabilized rearview mirror assembly for vehicles comprising:

a mirror housing having an inside surface defining an interior space;

a reflective mirror element having a perimeter edge and adjustably mounted for pivotal movement about a center of rotation within said housing interior space, said center of rotation having a pair of axes of rotation which are perpendicular to one another and pass therethrough;

a first vibration stabilizer mounted for sliding movement on said mirror element along one of said axes of rotation, extending beyond said perimeter edge of said mirror element, and engaging a first portion of said inside surface of said housing;

a second vibration stabilizer mounted for sliding movement on said mirror element along the other of said axes of rotation and extending beyond said perimeter edge at a position spaced from said first stabilizer, said second stabilizer extending perpendicular to said first stabilizer and engaging a second portion of said inside housing surface;

a spring engaging and biasing said stabilizers outwardly of said mirror element perimeter edge such that said stabilizers continuously engage said inside housing surface to reduce vibration of said mirror element while extending and retracting against said spring to adjust for varying distances between said perimeter edge of said mirror element and said inside housing surface when the position of said mirror element within said housing is adjusted;

said spring simultaneously engaging both said first and said second stabilizers, simultaneously biasing both said stabilizers into engagement with their respective inside housing surface portions, and being positioned to provide substantially equal force and loading on said first and second stabilizers.

2. The mirror assembly of claim 1 wherein said mirror element includes a front viewing surface and a rear surface; said stabilizer being mounted for sliding movement generally parallel to said rear surface.

3. The mirror assembly of claim 1 wherein said mirror element includes a front viewing surface and a rear surface; said assembly including a first and second slide mounts at spaced locations on said rear surface of said mirror element, said first stabilizer being slidably supported by said first slide mount for sliding movement generally parallel to said rear surface of said mirror element, said second stabilizer being slidably supported by said second slide mount for sliding movement generally parallel to said rear surface of said mirror element.

4. The mirror assembly of claim 3 wherein said mirror element includes a reflective mirror mounted on a support member, said support member including front and rear surfaces, said reflective mirror being mounted adjacent said front surface; said first and second slide mounts and stabilizers being on said rear surface of said support member.

5. The mirror assembly of claim 3 wherein said mirror element includes a reflective mirror mounted on a support member, said support member including front and rear surfaces, said reflective mirror being mounted adjacent said front surface; said first and second slide mounts and stabilizers being on said front surface of said support member and located intermediate said front surface and said reflective mirror.

6. The mirror assembly of claim 5 wherein said support member includes an upstanding rim defining a perimeter edge of said support member, said rim including a pair of spaced apertures therethrough which receive and guide said stabilizers, said first stabilizer extending through one of said apertures in said rim, said second stabilizer extending through the other of said apertures in said rim.

7. The mirror assembly of claim 3 wherein each of said first and second stabilizers are elongated fingers having generally parallel, opposing sides, a front housing surface engaging edge, and a rear, spring engaging edge, said first and second slide mounts each including a pair of spaced guide flanges on said mirror element, each pair of said guide flanges guiding and confining one of said fingers such that it slidably projects beyond said perimeter edge; said mirror element also including a spring support on said rear surface; said spring including an elongated spring extending around said spring support and having a pair of outwardly extending ends, one of said spring ends engaging said rear edge of one of said fingers, the other of said spring ends engaging said rear edge of the other of said fingers.

8. The mirror assembly of claim 7 wherein each of said fingers includes a shoulder, at least one of said guide flanges and said mirror element including a stop surface which engages said shoulder and limits extension of said finger outwardly of said perimeter edge.

9. The mirror assembly of claim 3 wherein said perimeter edge of said mirror element includes top, bottom and opposing end edges; said first stabilizer extending beyond one of said top and bottom edges, said second stabilizer extending beyond one of said opposing end edges.

10. The mirror assembly of claim 1 wherein said mirror element includes a spring support; said spring including an elongated spring extending around said spring support and having a pair of outwardly extending ends, one of said spring ends engaging said first stabilizer, and the other of said spring ends engaging said second stabilizer.

11. The mirror assembly of claim 1 including a pair of slide mounts on said mirror element for respectively slidably supporting said first and second stabilizers thereon, said first and second stabilizers being supported by said slide mounts for sliding movement generally parallel to said mirror element.

12. The mirror assembly of claim 11 wherein said mirror element includes a reflective mirror mounted on a support member, said support member including front and rear surfaces, said reflective mirror being mounted adjacent said front surface; said slide mounts and first and second stabilizers being on said rear surface of said support member.

13. The mirror assembly of claim 11 wherein said mirror element includes a reflective mirror mounted on a support member, said support member including front and rear surfaces, said reflective mirror being mounted adjacent said front surface; said slide mounts and first and second stabilizers being on said front surface of said support member and located intermediate said front surface and said reflective mirror.

14. A vibration-stabilized rearview mirror assembly for vehicles comprising:
    a mirror housing having an inside surface defining an interior space;
    a reflective mirror element having a perimeter edge and adjustably mounted for pivotal movement about a center of rotation within said housing interior space, said center of rotation having a pair of axes of rotation which are perpendicular to one another and pass therethrough;
    a pair of vibration stabilizers extending perpendicular to one another at spaced locations on said mirror element along a respective one of said axes of rotation, each stabilizer mounted for sliding movement on said mirror element and extending beyond said perimeter edge of said mirror element, one of said stabilizers engaging a first portion of said inside housing surface, the other of said stabilizers engaging a second portion of said inside housing surface which is spaced from said first portion; and
    a spring mounted on said mirror element and simultaneously engaging and biasing said stabilizers outwardly of said mirror element for continuous engagement with said respective inside housing surface portions to reduce vibration of said mirror element, said spring being positioned to provide substantially equal force and loading on said stabilizers whereby said spring provides loading of said stabilizers for extension and retraction to adjust for varying distances between said perimeter edge and said inside housing surface when the position of said mirror element is adjusted within said housing.

15. The mirror assembly of claim 14 wherein each of said stabilizers is mounted for sliding movement generally parallel to said mirror element.

16. The mirror assembly of claim 15 wherein said mirror element includes a reflective mirror mounted on a support member, said support member including front and rear surfaces, said reflective mirror being mounted adjacent said front surface, said stabilizers being mounted on said rear surface of said support member.

17. The mirror assembly of claim 15 wherein said mirror element includes a reflective mirror mounted on a support member, said support member including front and rear surfaces, said reflective mirror being mounted adjacent said front surface, said stabilizers being mounted on said front surface of said support member and located intermediate said front surface and said reflective mirror.

18. The mirror assembly of claim 17 wherein said support member includes an upstanding rim defining a perimeter edge of said support member, said rim including a pair of spaced apertures therethrough which receive and guide said stabilizers, said first stabilizer extending through one of said apertures in said rim, said second stabilizer extending through the other of said apertures in said rim.

19. The mirror assembly of claim 15 wherein said mirror element includes a front viewing surface and a rear surface; said assembly including first and second slide mounts at spaced locations on said rear surface of said mirror element, said first stabilizer being slidably supported by said first slide mount for sliding movement generally parallel to said rear surface of said mirror element, said second stabilizer being slidably supported by said second slide mount for sliding movement generally parallel to said rear surface of said mirror element.

20. The mirror assembly of claim 19 wherein each of said first and second stabilizers are elongated first and second fingers having generally parallel, opposing sides, a front housing surface engaging edge, and a rear, spring engaging edge, said first and second slide mounts each including a pair of spaced guide flanges on said mirror element, each pair of said guide flanges guiding and confining one of said fingers such that said finger slidably projects beyond said perimeter edge; said mirror element also including a spring mount on said rear surface; said spring including an elongated spring extending around said spring mount and having a pair of outwardly extending ends, one of said spring ends engaging said rear edge of one of said fingers, the other of said spring ends engaging said rear edge of the other of said fingers.

21. The mirror assembly of claim 20 wherein each of said fingers includes a shoulder, at least one of said guide flanges of said first slide mount and said mirror element including a first stop surface which engages said shoulder and limits extension of said first finger outwardly of said perimeter edge, at least one of said guide flanges of said second slide mount and said mirror element including a second stop surface which engages said shoulder and limits extension of said second finger outwardly of said perimeter edge.

22. The mirror assembly of claim 14 wherein said mirror element includes a spring support thereon; said spring including an elongated spring extending around said spring support and having a pair of outwardly extending ends, one of said spring ends engaging said first stabilizer, and the other of said spring ends engaging said second stabilizer.

23. The mirror assembly of claim 22 wherein each of said spring ends is generally of the same length.

24. A vibration-stabilized rearview mirror assembly for vehicles comprising:
    a mirror housing having an inside surface defining an interior space;
    a mirror unit including a reflective mirror element and a support member which holds said mirror element, said mirror element mounted on said support member, said support member having a perimeter edge;
    a pivot mount within said interior space of said housing, said pivot mount pivotally supporting and allowing pivotal adjustment of said mirror unit about a center of rotation within said housing interior space, said center of rotation having a pair of axes of rotation which are perpendicular to one another and pass therethrough;
    said support member including a first vibration dampening member which reduces the vibration of said mirror unit, said first dampening member slidably mounted on said support member along one of said axes of rotation, extending beyond said perimeter edge of said support member, and engaging a first portion of said inside surface of said housing;
    a second vibration dampening member mounted for sliding movement on said support member along the other of said pair of axes of rotation in a direction perpendicular to said first vibration dampening member and extending beyond said perimeter edge at a position spaced from said first dampening member, said second dampening member engaging a second portion of said inside housing surface:
    a spring simultaneously engaging and biasing said first and second dampening members outwardly of said support member, said spring simultaneously biasing both said first and second dampening members into engagement with their respective inside housing surface portions, said spring being positioned to provide substantially equal force and loading on said vibration dampening members:
    a stop which engages and limits extension of said first dampening member such that said dampening member constantly engages said inside housing surface and is extended by and retracts against said spring to adjust for varying distances between said perimeter edge of said support member and said inside housing surface when the position of said mirror unit is adjusted; and
    a second stop which engages and limits extension of said second dampening member.

25. The mirror assembly of claim 24 including first and second slide mounts at spaced locations on said support member, said first dampening member being slidably supported by said first slide mount for sliding movement generally parallel to said mirror element; said second dampening member being slidably supported by said second slide mount for sliding movement generally parallel to said mirror element.

26. The mirror assembly of claim 25 wherein said stop is a limit surface on said first slide mount, and said second stop is a limit surface on said second slide mount.

27. The mirror assembly of claim 25 wherein said support member includes an upstanding rim defining said perimeter edge, at least one of said first and second dampening members projecting through an aperture in said rim, at least one of said stop and second stop including a portion of said rim adjacent said aperture through which said one of said first and second dampening members projects.

28. The mirror assembly of claim 24 wherein each of said stop and second stop is a limit surface on said support member.

29. The mirror assembly of claim 24 wherein said support member includes a spring support, said spring including an elongated spring extending around said spring support and having a pair of outwardly extending ends, one of said spring ends engaging said first dampening member, the other of said spring ends engaging said second dampening member.

30. The mirror assembly of claim 29 wherein each of said spring ends is generally of the same length.

* * * * *

UNITED STATES PATENT AND TRADEMARK OFFICE
CERTIFICATE OF CORRECTION

PATENT NO. : 5,818,650
DATED : October 6, 1998
INVENTOR(S) : Eldon J. Nyhof et al.

It is certified that error appears in the above-identified patent and that said Letters Patent is hereby corrected as shown below:

Column 8, line 36:
"10" should be --120--

Column 10, 66:
"stabilizer" should be --stabilizers--

Column 14, line 12:
":" should be --;--

Column 14, line 20:
":" should be --;--

Signed and Sealed this

Sixth Day of July, 1999

Q. TODD DICKINSON

*Attest:*

*Attesting Officer*    Acting Commissioner of Patents and Trademarks